Patented Apr. 27, 1954

2,676,958

UNITED STATES PATENT OFFICE 2,676,958

AZO-DYESTUFFS

Walter Hanhart, Riehen, Switzerland, assignor to Ciba Limited, Basel, Switzerland, a Swiss firm No Drawing. Application March 12, 1951, Serial No. 215,191

Claims priority, application Switzerland March 17, 1950

8 Claims. (Cl. 260—176)

According to this invention valuable new azo-dyestuffs are made by coupling 4:4'-diacetoacetylamino-stilbene-2:2'-disulfonic acid on each side with a diazo compound of an amine containing in ortho-position to the diazotizable amino-group a substituent capable of leading to the formation of complex metal compounds.

The 4:4'-diacetoacetylamino - stilbene - 2:2'-disulfonic acid of the formula

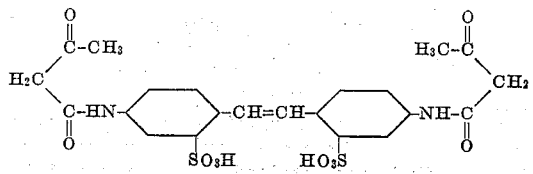

used as starting material in the process of the invention can be made from 4:4'-diaminostilbene-2:2'-disulfonic acid by the action of an acylating agent which is capable of introducing the radical of acetoacetic acid. For this purpose diketene can be used in a simple and satisfactory manner. The reaction is advantageously conducted in an aqueous medium, if desired, with the addition of a catalyst. When diketene is used the reaction generally occurs easily even at room temperature or at most at a slightly raised temperature.

In accordance with the process of the invention 4:4'-diacetoacetylamino-stilbene-2:2'-disulfonic acid is coupled on both sides with diazo compounds of amines which contain in ortho-position to the diazotizable amino group a substituent which is capable (together with the enolizable keto groups of the coupling component) of leading to the formation of complex metal compounds. Substituents of this kind, are, for example, hydroxyl groups, the group —O—CH₂—COOH and especially carboxyl groups. The diazo components may belong to the benzene series. In addition to the aforesaid substituents they may contain others such as sulfonic acid groups, sulfonic acid amide groups, but especially those substituents which do not impart solubility such as halogen atoms (for example chlorine), alkyl groups (for example methyl), alkoxy groups (especially methoxy), nitro groups, acylamino groups (for example, acetylamino or benzoylamino) or aryl-azo-groups. As examples of suitable diazo components there may be mentioned: 4-chloro-2-amino-1-hydroxybenzene, 4-methyl-2-amino-1-hydroxybenzene, 4-methoxy-2-amino-1-hydroxybenzene, 4 - nitro - 2 - amino-1-hydroxybenzene, 4 - nitro - 6 - chloro-2-amino-1-hydroxybenzene, 2 - amino - 1 - hydroxybenzene-4-sulfonic acid amide, 2-aminobenzene-1-carboxylic acid, 2-amino-5-chlorobenzene-1-carboxylic acid, 5-benzoylamino-2-aminobenzene - 1 - carboxylic acid, 2-aminobenzene-1-carboxylic acid - 5 - sulfonic acid, 2 - amino - 4 - methyl-1-carboxymethoxybenzene.

The 4:4' - diacetoacetylamino - stilbene-2:2'-disulfonic acid is coupled on both sides either with the same diazo compound or in each of the two coupling positions with one of two different diazo compounds of the kind mentioned above. The coupling reactions are advantageously conducted in an alkaline medium, for example, a medium rendered alkaline with an alkali carbonate.

The dyestuffs obtainable by the present process are new and correspond to the general formula

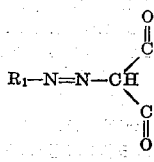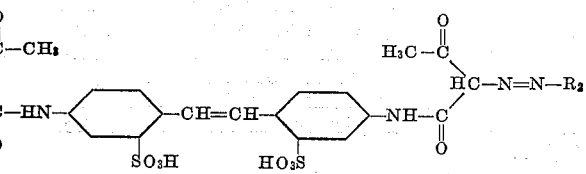

in which R₁ and R₂ each represent the radical of a diazo component which contains in ortho-position to the azo group a substituent capable of leading to the formation of complex metal compounds.

The dyestuffs are suitable for dyeing a very wide variety of materials, for example animal fibers, such as wool, silk and leather, but especially for dyeing or printing cellulose materials such as cotton, linen and artificial silk or staple fibers of regenerated cellulose. The dyestuffs can be converted in substance in the dyebath or on the fiber into complex metal compounds, for example, copper, chromium, iron, nickel or cobalt compounds. The conversion into such complex metal compounds is carried out by known methods in an acid, neutral or alkaline medium, under atmospheric or superatmospheric pressure, with or without additions, such as salts of inorganic or organic acids such as tartaric acid, acid-binding agents or agents capable of assisting the formation of complexes, such as pyridine.

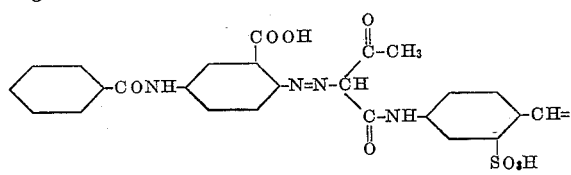

The production of metal, especially copper, compounds in substance is of special value in the case of those metal-free dyestuffs of which the absorption capacity is too weak and/or when the metalliferous dyestuffs still possess an adequate solubility (the latter is usually true in the case of dyestuffs obtainable from diazo-compounds containing sulfonic acid groups). When the dyestuffs obtainable by the present process contain only a few groups imparting solubility (for example, only the sulfonic acid groups in the stilbene radical and in the radical of the diazo components only carboxyl groups in ortho-position to the azo groups), they may be treated, for example, advantageously on the fiber or partially on the fiber and partially in the dyebath with agents yielding metal by generally known methods. It is of advantage to use, for example, the process of U. S. Patent No. 2,148,659, in which first the dyeing and then the treatment with an agent yielding metal are carried out in the same bath. As agents yielding metal there come into consideration more especially those which are stable to alkaline solutions, such as complex copper tartrates and the like.

In some cases especially valuable dyeings can be obtained by the process in which a dyeing or printing produced with the metal-free dyestuff is after-treated with aqueous solutions containing a basic formaldehyde condensation product of a compound containing in the molecule at least once the atomic grouping

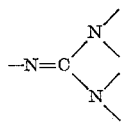

or a compound such, for example, as cyanamide which can be easily converted into such a compound, and which solution also contains a water-soluble complex metal compound, especially a complex copper compound. Such processes are described, for example, in British Patent No. 619,969.

The following examples illustrate the invention, the parts and percentages being by weight:

*Example 1*

5.1 parts of 2-amino-5-benzoylaminobenzene-1-carboxylic acid are dissolved in the form of the sodium salt in 100 parts of water, and after the addition of 1.4 parts of sodium nitrite the solution is poured on to ice and 9 parts of hydrochloric acid of 30 per cent. strength while stirring well. The diazo compound is coupled with a solution, rendered alkaline with sodium carbonate, of 5.3 parts of 4:4'-diacetoacetylaminostilbene-2:2'-disulfonic acid. When the coupling is finished the precipitated dyestuff of the formula

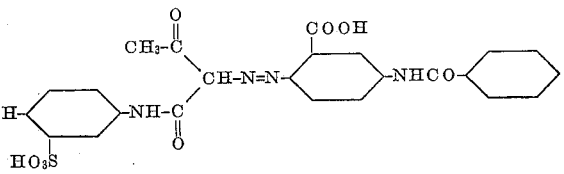

is separated by filtration and dried. It is a yellow powder which dissolves in a dilute sodium carbonate solution and in concentrated sulfuric acid with a yellow coloration, and dyes cotton by the single bath or two-bath after-coppering process greenish yellow tints which are fast to washing and light.

The 4:4' - diacetoacetylamino-stilbene - 2:2' - disulfonic acid may be prepared as follows:

370 parts of 4:4'-diamino-stilbene-2:2'-disulfonic acid are dissolved in 3000 parts of water with about 120 parts of sodium carbonate to form a neutral solution. 170 parts of diketene are introduced dropwise into the solution at 10–15° C., while stirring well, in the course of 2 hours. The temperature of the reaction mixture rises to 20–25° C. In a short time the condensation product begins to separate out in the form of almost colorless crystals. The whole is stirred for 12 hours at room temperature. At the end of this period free amine can no longer be detected in a test portion of the mixture. The whole is filtered, and the filter residue is washed with sodium chloride solution of 10 per cent. strength. After drying the product in vacuo at 60–70° C., there are obtained 570–590 parts of the condensation product in the form of its disodium salt as an almost colorless crystalline powder having a content of 4:4'-diacetoacetylamino-stilbene-2:2'-disulfonic acid amounting to about 80 per cent. calculated as the free acid.

*Example 2*

3.4 parts of 2-amino-5-chlorobenzene-1-carboxylic acid are dissolved in the form of the sodium salt in 50 parts of warm water and after the addition of 1.4 parts of sodium nitrite the mixture is poured on to ice and 9 parts of hydrochloric acid of 30 per cent. strength while stirring. The diazo compound is coupled with a solution, rendered alkaline with sodium carbonate, of 5.3 parts of 4:4'-diacetoacetylamino-stilbene-2:2'-di-sulfonic acid. When the coupling is finished the precipitated dyestuff of the formula

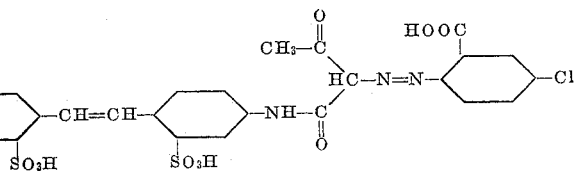

is separated by filtration and dried. It is a yellow powder which dissolves in water and in concentrated sulfuric acid with a yellow coloration, and dyes cotton by the single bath or two-bath after-coppering process fast greenish yellow tints.

*Example 3*

3 parts of 4-nitro-2-amino-1-hydroxybenzene are dissolved in 30 parts of water with the addition of 4 parts of hydrochloric acid of 30 per cent.

strength and diazotized with a sodium nitrite solution of about 20 per cent. strength containing 1.4 parts of sodium nitrite. The diazo compound is coupled in a solution rendered alkaline with sodium carbonate with 5.3 parts of 4:4'-diacetoacetylamino-stilbene - 2:2' - disulfonic acid, and the precipitated dyestuff is separated by filtration when the coupling is finished. It corresponds to the formula

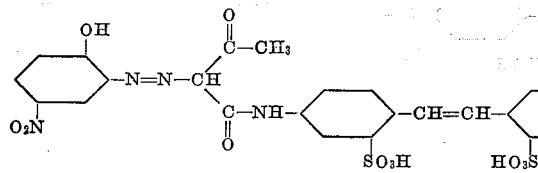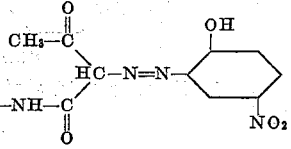

When dry the dyestuff is a red powder which dissolves in water with a yellow-red coloration and in concentrated sulfuric acid with a yellow coloration, and dyes cotton by the single bath or two-bath after-coppering process fast reddish yellow tints.

*Example 4*

5.1 parts of 2-amino-5-benzoylaminobenzene-1-carboxylic acid are diazotized as described in Example 1 and coupled while cooling in an acetic acid medium with 10.6 parts of 4:4'-diacetoacetylamino-stilbene-2:2'-disulfonic acid. The coupling may be accelerated by adding sodium bicarbonate solution dropwise. The product is then coupled in a solution rendered alkaline with sodium carbonate with the diazo compound obtainable from 3.4 parts of 2-amino-5-chlorobenzene-1-carboxylic acid. When the coupling is finished the dyestuff is separated by filtration and dried. It corresponds to the formula

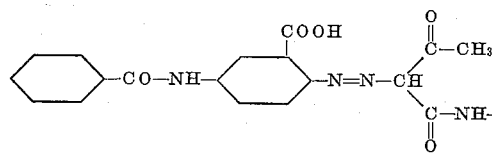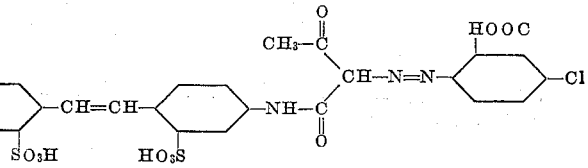

It is a yellow powder which dissolves in water and in concentrated sulfuric acid with a yellow coloration, and dyes cotton by the single bath or two-bath after-coppering process fast greenish-yellow tints.

*Example 5*

100 parts of cotton are entered at 50° C. into a dyebath consisting of 4000 parts of water, 2 parts of anhydrous sodium carbonate and 2 parts of the dyestuff obtainable as described in Example 1. The temperature is raised in the course of 20 minutes to 90–95° C., 30 parts of crystalline sodium sulfate are added, and dyeing is carried on for 30 minutes at 90–100° C. The whole is then allowed to cool to about 70° C. and the further treatment is as described under (a), (b) or (c) below.

(a) The dyeing is rinsed with cold water and treated for ½ hour at 50° C. in a bath containing 4000 parts of water, 3 parts of crystalline copper sulfate and 1 part of acetic acid. The material is then rinsed and dried. A greenish-yellow dyeing is obtained having good fastness to light and good properties of wet fastness.

(b) To the dyebath cooled to about 70° C. are added 4 parts of complex copper sodium tartrate of approximately neutral reaction, coppering is carried on for ½ hour at about 80° C., and the dyeing is rinsed with cold water. If desired, the dyeing may be soaped by after-treatment for ½ hour in a bath containing per liter, 5 grams of Marseilles soap and 2 grams of anhydrous sodium carbonate. There is obtained a greenish-yellow dyeing of good fastness to light and having good properties of wet fastness.

(c) The dyeing is rinsed with cold water, and then after-treated for ½ hour at 20° C. in a solution prepared by dissolving 4.5 parts of the water-soluble condensation product of dicyandiamidine and formaldehyde, 1.5 parts of copper acetate and 6 parts of concentrated aqueous ammonia solution in 3000 parts of water, and adding 2 parts of anhydrous sodium carbonate to the solution containing the cupric-tetramine acetate. The material is then rinsed and dried. There is obtained a greenish-yellow dyeing which is distinguished by good fastness to light and good properties of wet fastness.

What I claim is:

1. An azo dyestuff which in its free acid state corresponds to the formula

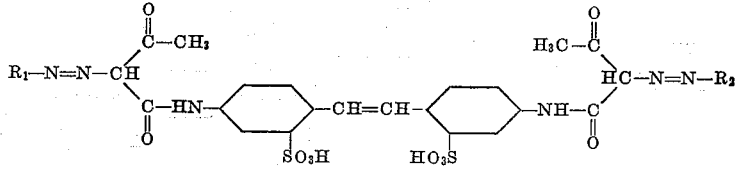

in which R₁ and R₂ each represent a benzene radical containing in ortho-position to the azo group a substitutent selected from the group consisting of a carboxylic acid group and a hydroxyl group.

2. An azo dyestuff which in its free acid state corresponds to the formula

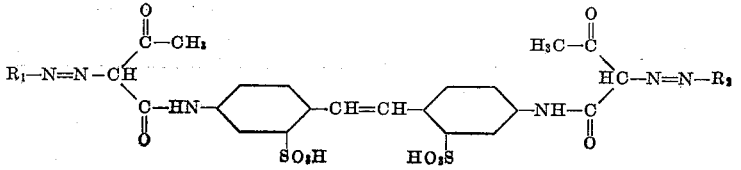

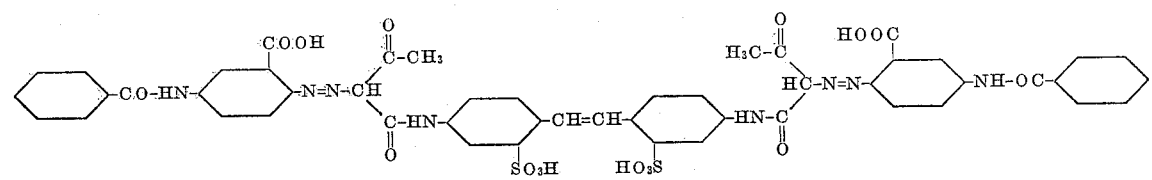

3. An azo dyestuff which in its free acid state corresponds to the formula

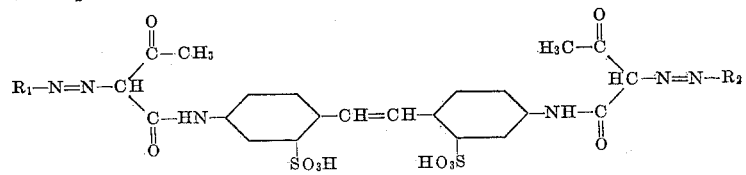

in which $R_1$ and $R_2$ each represent a benzene radical containing in ortho-position to the azo group a hydroxyl group but being otherwise free from substituents imparting solubility.

4. An azo dyestuff which in its free acid state corresponds to the formula

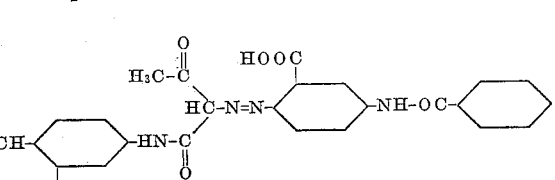

in which each $R_1$ represents the same benzene radical which contains, as the sole group imparting solubility, in ortho-position to the azo group a carboxylic acid group.

5. The azo-dyestuff which in its free acid state corresponds to the formula

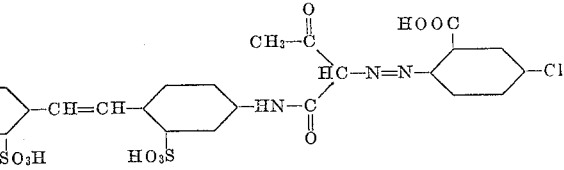

6. The azo-dyestuff which in its free acid state corresponds to the formula

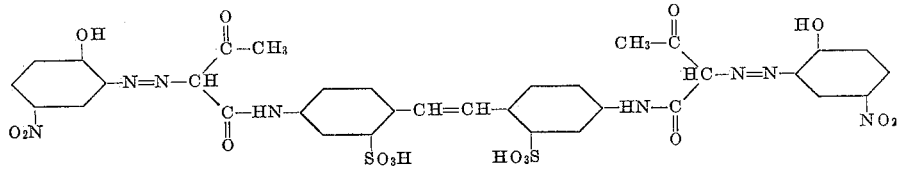

7. The azo-dyestuff which in its free acid state corresponds to the formula

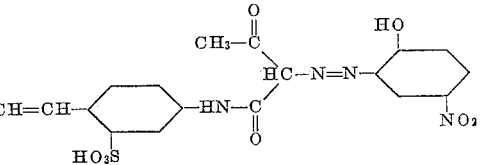

8. The azo-dyestuff which in its free acid state corresponds to the formula

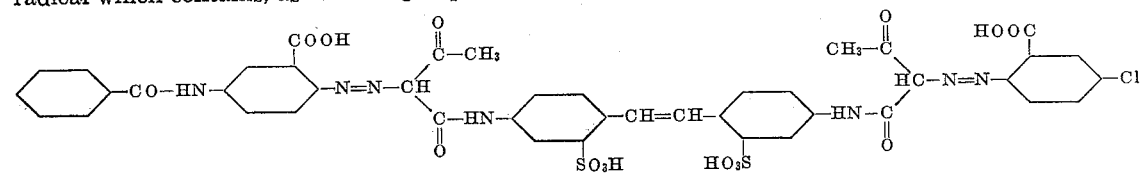

References Cited in the file of this patent

UNITED STATES PATENTS

| Number | Name | Date |
|---|---|---|
| 1,082,924 | Blank et al. | Dec. 30, 1913 |
| 2,009,397 | Goldstein | July 30, 1935 |
| 2,310,181 | Mackenzie | Feb. 2, 1943 |

FOREIGN PATENTS

| Number | Country | Date |
|---|---|---|
| 169,244 | Switzerland | Aug. 1, 1934 |